United States Patent [19]

Kopaniky et al.

[11] 3,789,831

[45] Feb. 5, 1974

[54] THERMOELECTRIC PROBE APPARATUS FOR TISSUE FLUID FLOW MEASUREMENT

[76] Inventors: Dennis R. Kopaniky, Case Western Reserve University, School of Medicine, 2109 Adelbert Rd., Cleveland, Ohio 44106; Donald S. Gann, 720 Rutland Ave., Baltimore, Md. 21205

[22] Filed: Feb. 11, 1972

[21] Appl. No.: 225,582

[52] U.S. Cl. ............................... 128/2.05 F, 73/204
[51] Int. Cl. ............................................. A61b 5/02
[58] Field of Search ..... 128/2.05 F, 2.05 V, 2.05 R, 128/2 H, 2 E, 2 R; 73/204

[56] References Cited
UNITED STATES PATENTS

| 3,335,606 | 8/1967 | Scarpa | 73/204 |
| 3,595,079 | 7/1971 | Grahn | 73/204 |
| 3,075,515 | 1/1963 | Richards | 128/2.05 F |
| 3,372,590 | 3/1968 | Sterling | 73/204 |
| 3,359,974 | 12/1967 | Khalil | 128/2.05 F |
| 3,438,253 | 4/1969 | Kuether et al. | 73/204 |
| 3,478,588 | 11/1969 | Richardson | 128/2.05 F X |
| 3,620,207 | 11/1971 | Sinclair | 128/2.05 F |
| 3,589,360 | 6/1971 | Sinclair | 128/2.05 F |
| 2,870,305 | 1/1959 | Ling | 73/204 X |

FOREIGN PATENTS OR APPLICATIONS 1,033,741 6/1966 Great Britain ................. 128/2.05 F Primary Examiner—Kyle L. Howell
Attorney, Agent, or Firm—J. Gibson Semmes

[57] ABSTRACT

This is a thermoelectric probe apparatus which is responsively connected to an electrical amplifying readout circuit. The probe is most useful in sensing blood flow at minute loci throughout the animal body. It can sense as low as zero blood flow with significantly less tissue trauma than previous devices.

3 Claims, 5 Drawing Figures

THERMOELECTRIC PROBE APPARATUS FOR TISSUE FLUID FLOW MEASUREMENT

BACKGROUND OF THE INVENTION

Measuring local tissue blood flow has been limitedly attempted by various researchers in the past.

As early as 1933, a heated thermocouple technique was known which involved the measuring of temperature variations in a region of tissue in which a heating element supplied with a constant heating current has been placed. As blood flow approached zero in the vicinity of the heating element, the blood and tissue near the heating element is unable to dissipate heat by the normal convective pattern, and blood temperature continues to rise after zero blood flow is reached. Unfortunately, in this method, zero blood flow cannot be defined and the method is not quantitative.

In 1952, there was developed the method of maintaining of a heating element at a predetermined temperature above ambient tissue temperature by adjusting heating currents by hand. While useful, this method required full attention of the operator and thus is impractical for extended experimentation.

Then, in 1965, there became known a technique to calculate blood flows to tissue by abruptly stopping the blood flow and back-calculating the rate of flow prior to the cutoff. Because of the time delay, this method is not instantaneously accurate.

More recently, it has been known to use thermistors in place of thermocouples heated by a constant current. Blood flows are calculated from a mathematical formula using the temperature difference between the two thermistors caused by the volume rate of local tissue blood flow past them. The calculations required for such an approach however, are cumbersome without expensive computer assistance.

DESCRIPTION OF THE PREFERRED EMBODIMENTS

The prmary objective of this invention is to accurately read the blood flow rate at various locations on and within the animal body, to include blood flow rates at, in or on interior organs of the body such as, for example, livers, pituitaries and other glands.

Figure 1:
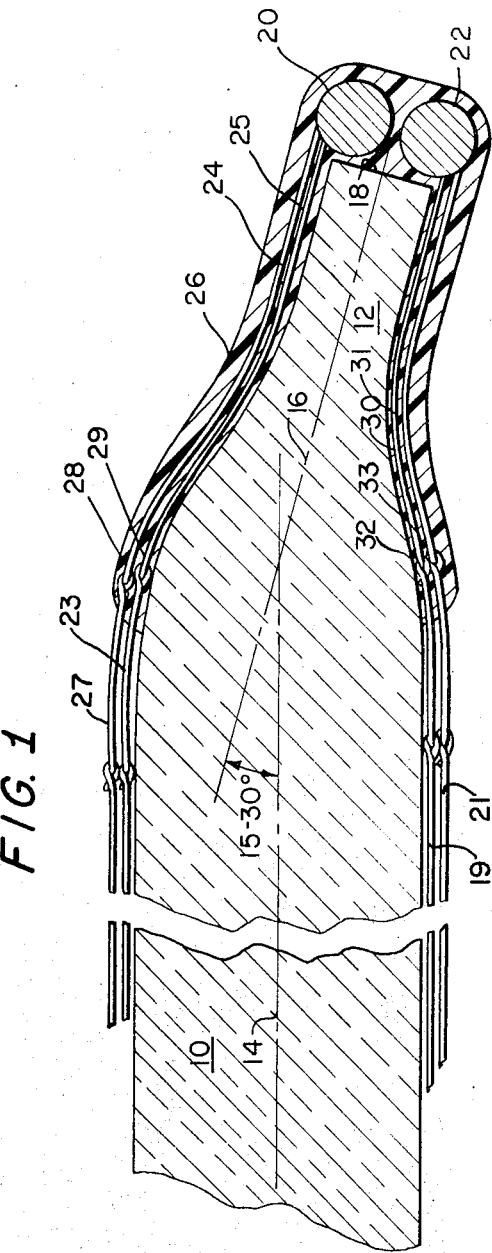
FIG. 1 — illustrates an enlarged cross-sectional view of the thermoelectric probe.
Figure 2:
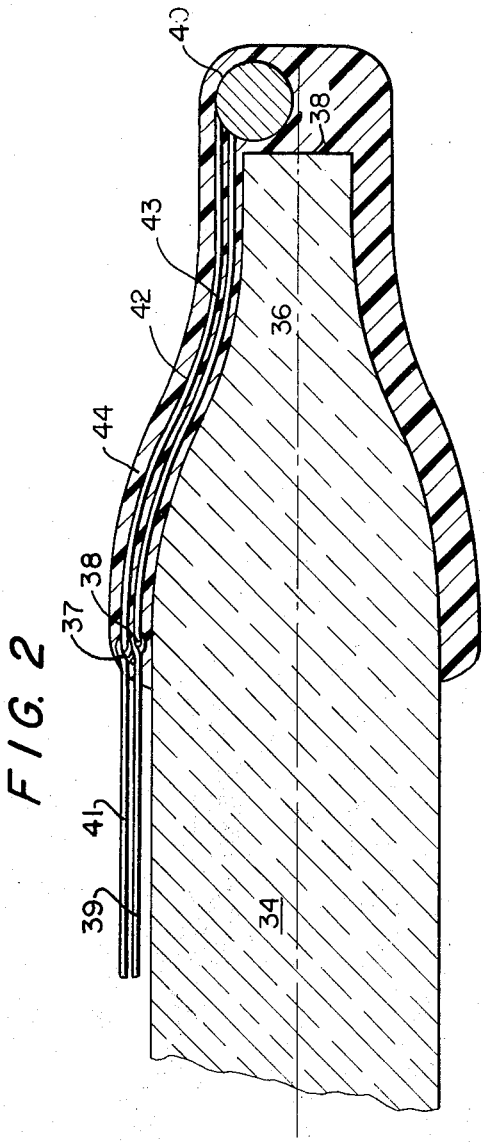
FIG. 2 — illustrates a temperature compensator probe.

The prior art having proved unsatisfactory and to achieve the desired end, the devices illustrated in FIGS. 1 and 2 have been developed. In particular, as shown in FIG. 1, a small instrument 10 for insertion within the body is presented. The instrument shown here is a glass tube or rod 10 having its end or tip 12 pulled to a fine common miniaturized dimension. The rod 10 could, of course, be constructed of any material found medically desirable for insertion within the body. In actual practice, such a rod 10 is constructed having a diameter of 2mm and its end or tip 12 having a diameter of 0.015 inch or 0.38mm. The tip 12 is pulled at an angle to the axis 14 of the rod 10. In the embodiment shown, the axis 16 of the tip 12 is constructed at from 15° to 30° angle to the axis 14 of the rod 10. Onto the terminal end edge or face 18 of the tip 12, two thermistor beads 20, 22 such as are commercially available are cemented. Thermistor bead 20 is connected electrically into the circuitry shown in FIG. 3 and described below by two leads 24, 25 which are permanently fastened onto the rod 10 by insulating material 26. The thermistor 24, 25 are looped at position 28, 29 within the insulating material around output leads 23, 27 and soldered prior to being encased within the insulating material 26. Similarly, thermistor bead 22 is connected electrically to the circuitry of FIG. 3 by leads 30, 31 and looped at positions 32, 33 around output leads 19, 21 and soldered prior to being encased within the insulating material 26.

A second glass rod 34, having its tip 36 pulled to a fine, miniaturized thickness is also constructed, as shown in FIG. 2. On the edge or face 38 of this second rod 34 is cemented one thermistor bead 40, similar to the aforementioned thermistor beads 20, 22. In this modification, thermistor bead 40 also is connected into the electrical circuitry of FIG. 3 by leads 42, 43 held into contact with rod 34 by insulating material 44. As in the earlier discussed leads 24, 25, 30, 31, leads 42, 43 are looped at positions 37, 38 around output leads 39, 41 and soldered prior to being encased within the insulating material 44 to provide better solder connection. In this second rod 34, the tip 36 is coaxial with the rod 34, differing from the rod 10 construction shown in FIG. 1.

Figure 3:
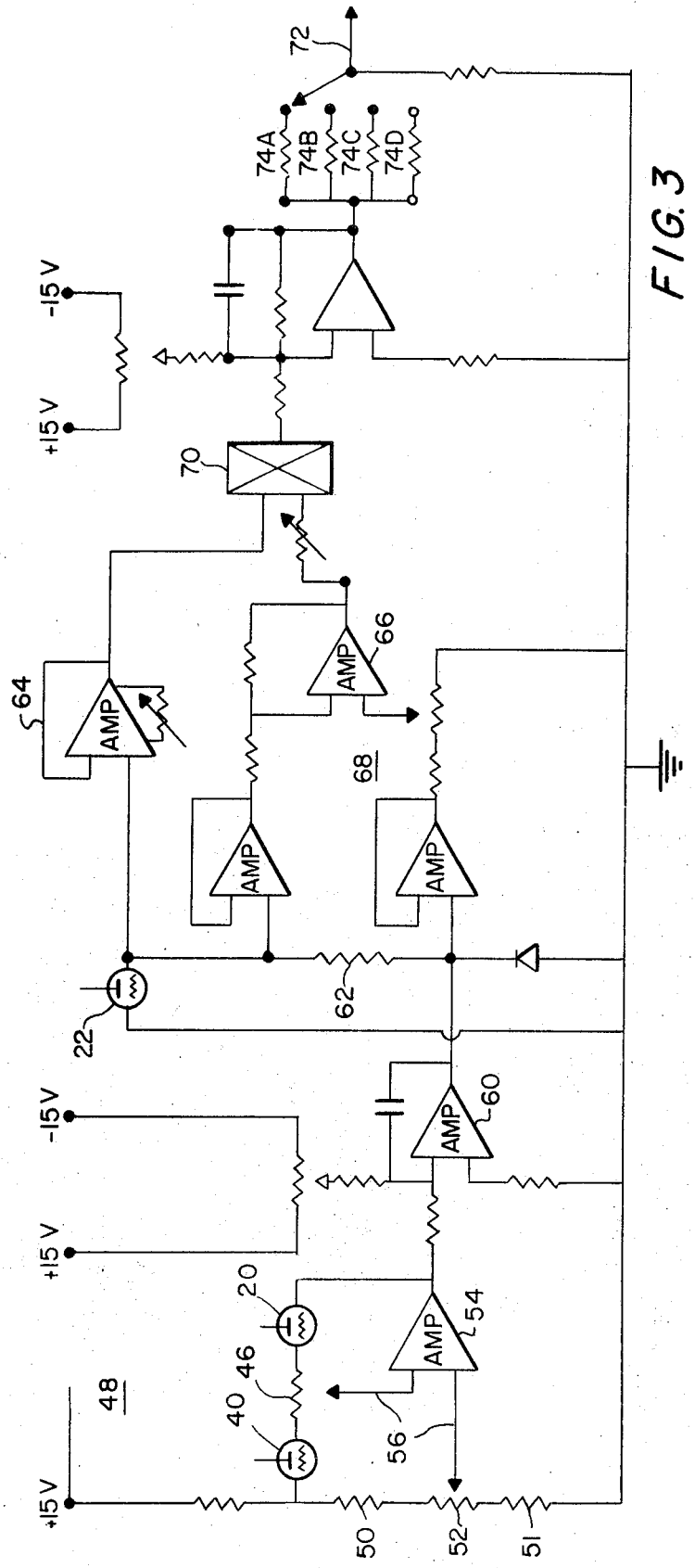
FIG. 3 — illustrates schematically the electrical circuitry enabling an instantaneous intelligble readout.

The thermistor beads 20, 40 are respectively electrically connected in series with potentiometer 46 in the circuit of FIG. 3 in the voltage dividing portion 48 shown. The other, divided part of the voltage dividing circuit portion 48 consists of the series connection of resistors 50, 51 and potentiometer 52. An amplifying circuit 54 is bridged across the two potentiometers 46, 52 as shown. Signals picked up by the bridge amplifier 54 are fed via amplifier 60 and resistor 62 to the thermistor 22, which, as will be described below, is placed in close proximity to thermistor 20 in actual practice.

In constructing the sensitive tips of the probes, the respective thermistor beads were cemented by suitable glue to their respective tips or edges. With respect to the rod or probe 10 having two thermistor beads at its tip 18, one thermistor bead is first cemented to the tip 18 with its leads placed alongside the rod 10. The probe is then dipped into an insulating enamel. The probe is dipped to a distance covering the thermistor bead 20, thermistor leads 24, 25, and the solder joints 28, 29 having the wires looped around electrical conductance wires for better connection. The probe 10 is then removed from this depth slowly and allowed to dry for 1 hour. The probe is then dipped two more times into the insulating enamel, allowing an hour between each dip for drying.

After the last dip and a 24 hour drying period, the second bead 22 is cemented onto the tip 18 of the probe 10, with its leads 30, 31 strewn alongside the glass rod. The probe 10 is then dipped into an insulating material. Preferably the insulating material in th second set of dips is an unthinned plastic such as can be found commercially on the market marketed under the trade name "INSUL-X," for example. The probe is then removed slowly from the insulating material, and allowed to dry for 1 hour as above described. This dipping is repeated two times, allowing 1 hour intervals between each of the three dips for drying. At the conclusion of the third dip in this second set of dips, the probe again is allowed to dry for 24 hours.

The second probe 34, having only one bead 40, is constructed according to the following method. The bead 40 is cemented to edge 38 of the miniaturized end 36 of the glass rod 34, having its miniaturized leads 42, 43 strewn alongside the rod 34. The probe tip 36 is then dipped into an insulation material to a distance covering the thermistor bead 40, thermistor leads 42, 43 and the solder joints connecting the miniaturized leads 42, 43 to normal size leads as described. The probe 34 is slowly removed from the dip, and allowed to dry for 1 hour. The insulating material is, again, preferably an unthinned plastic insulation material, such as can be found commercially on the market under the tradename "INSUL-X," for example. The probe 34 is then dipped into the insulating material two times, again allowing 1 hour between each dip for drying. After the probe 34 has been removed from the dip slowly for the third time, the probe 34 is allowed to dry for 24 hours.

A second method for constructing the probe 10 having two thermistor beads 20, 22 has been developed. According to the second method, a first bead is cemented to the tip 18 of rod 10, having its miniaturized leads 24, 25 strewn alongside the rod 10 in the usual aforementioned manner. The probe 10 is dipped into a liquid epoxy to a distance covering the thermistor bead 20, the miniaturized thermistor leads 24, 25 and the solder joints 28, 29. The probe is then removed slowly from the epoxy bath and cured at 200° C for 1½ hours. The second bead 22 is then cemented to the tip edge 18 with the epoxy coating thereon, having the leads 30, 31 for the second bead strewn alongside the rod 10 as aforementioned. The probe 10 having two beads 20, 22 is then immersed into the liquid epoxy a second time. The second immersion should again cover the thermistor beads 20, 22, miniaturized thermistor leads 24, 25. 30, 31 and the solder joints 28, 29, 32, 33. The probe 10 is then removed from the bath slowly and cured again for 1½ hours at 200° C. The liquid epoxy should be a single component epoxy which is made liquid by heating it slowly.

In order to smooth the pitted areas which normally result from using the second method for constructing the two thermistor bead probe 10, the probe 10 after its second curing in this method is dipped into a thinned plastic insulation material. The thinned plastic insulation material should have a ratio to the thinner of one to three. The thinned plastic insulation material preferably could be that as can be commercially obtained under the tradename "INSUL-X," but any similar material should prove satisfactory. The immersion into the thinned plastic insulation material should cover the thermistor beads 20, 22, thermistor leads 24, 25, 30, 31, and solder joints 28, 29, 32, 33, as described in the aforementioned immersions. The probe tip 10 is then slowly removed from the thinned plastic insulation material bath and allowed to dry for 1 hour. The immersion of the probe tip 10 into the thinned plastic is repeated two times, allowing 1 hour drying periods between each immersion.

In operation, the rod 10 is placed at the location or position where the accurate blood flow rate reading is desired. The rod 34 is placed nearby the probe rod 10, but a sufficient distance so that thermistor 40 is not influenced by the heat of the thermistor heater 22. The connection of the bridge amplifier 54 to the two potentiometers 46, 52 is set so that in a desired temperature range (under no flow conditions) no change in the relative output of thermistors 20, 40 is noticed. Theoretically, if the two thermistor beads 20, 40 were electrically identical, no additional calibration with the potentiometers 46, 52 would be necessary. It is essential, in any event, that the thermistor beads 20, 40 exhibit identical thermal characteristics so that changes in ambient tissue temperature affect both identically.

The probe heater thermistor bead 22 is set so that the sensing probe tip 12 is maintained at a constant temperature above ambient tissue temperature. In practice, a tip 12 temperature 2.5° C. above ambient temperature was found to be operative.

As the temperature of thermistor bead 20 either raises or lowers, the equilibrium of the bridge 48 is upset and a current is set up in line 56. The current is amplified by bridge amplifier 54, and amplifier 60 so that additional power is supplied to the thermistor bead 22 through resistance 62. Changes in voltage supplied to thermistor bead 22 are amplified by amplifying circuit 64, and changes in current supplied are sensed by bridge amplifier 66, both changes being multiplied by power multiplier 70. Resulting power signals are then read out, usually progressively advancing time record sheets by a power sensitive needle 72. A plurality of selectable resistances 74A, 74B, 74C, 74D, are provided so that a wide fluctuation in the power output can be used.

It has been found that blood flow can be determined by beginning with the following equation developed and discussed by W. Perl and others in 2 *J. of Theoret. Biol.* 201 (1962); 108 *A. New York Acad. Sci.* 92 (1963); and, 5 *Biophysical Journ.* 211 (1965):

$$C_T \rho_T \, dT/dt = K \Delta^2 T - C_B \rho_B \Phi (T - T_o) + IE + dq/dt$$

where
$C_T$ = specific heat of tissue
$C_B$ = specific heat of blood
$\rho_T$ = mass density of tissue
$\rho_B$ = mass density of blood
$\Phi$ = capillary blood flow per unit volume (ml blood/ml tissue/sec)
$K$ = thermal conductivity of tissue (cal/cm sec° C);
$T_o$ = temperature of incoming blood; also taken to be ambient tissue temperature
$T$ = local tissue temperature
$dq/dt$ = local rate of thermal energy production by metabolism
$\Delta^2$ = mathematical operator representing the divergence of the gradient
$I$ = current to the heating element
$E$ = voltage across heating element Under steady state conditions (where $dt/dt = 0$ and $dq/dt = 0$) and assuming that $C_T$, $C_B$, $\rho_T$ and $\rho_B$ are constant, this equation can be reduced to a definition of $\Phi$, or blood flow:

$$\Phi = IE / C_B \rho_B (T - T_o) + [K \Delta^2 T / C_B \rho_B (T - T_o)]$$

If the quantity $(T - T_o)$ is held constant and if the constant $K$ is made negligible, the blood flow will be a linear function of the power supplied to thermistor bead 22. The constant $K$ is negligible, and by maintaining the temperature of the tip or face 18 at a constant temperature above ambient tissue temperature (which is achieved by the responsivity of the current into thermistor bead 22 to the current in the bridge 48) $T - T_o$ is maintained at a constant value.

It should be noted that the time constant of the apparatus as practiced herein is much smaller than the time constant of the dynamics of blood flow as seen in vascular tissue beds.

The following experiments were made, showing the assumptions to be correct and the results to be as taught herein:

Experiment I

The probe was calibrated in an isolated dog thyroid perfused with heparinized blood. The outer connective tissue capsule was carefully removed from the thyroid tissue. Both the sensing probe 10 and the temperature compensation probe 34 were pressed snugly against thyroid tissue. Blood was pumped from a femoral arterial cannula to the thyroid. A peristaltic perfusion pump (Harvard) was used. As indicated by the equation above, the electric power to the probe heater 22 was found to be linearly proportional to blood flow in the range 0–1.06 ml/min. Normalized to the thyroid tissue weight (0.394g.), the linear range was 0–2.65 ml/min/g. tissue, as shown in the following graph where blood flow has been normalized to grams of thyroid tissue perfused and the output is arbitrary:

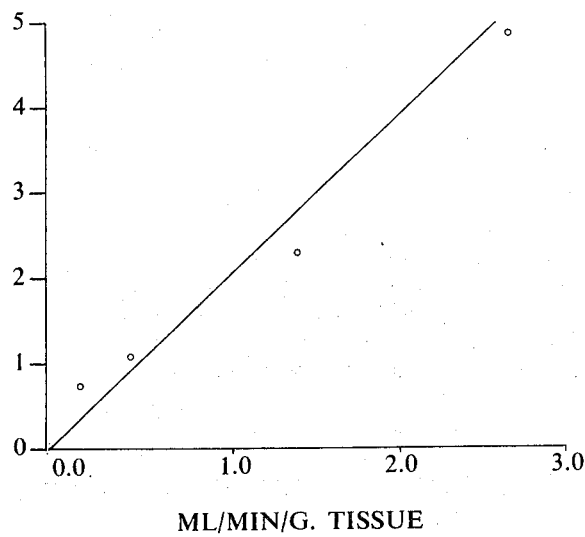

OUTPUT

ML/MIN/G. TISSUE

EXPERIMENT II

The instruments taught herein have been used to measure anterior pituitary blood flow in anesthetized dogs. The pituitary was exposed through the basisphenoid bone. The tip of the sensing probe 10 was placed snugly against either lateral lobe of the anterior pituitary. The shaft 12 of the probe 10 was set at a thirty degree angle with the flat surface of the basisphenoid bone. From experiment to experiment, the geometry of the probe tip 12 with respect to the pituitary tissue was kept constant.

Since the volume of anterior pituitary tissue is too small to accomodate both the sensing probe 10 and the temperature compensation probe 34, the tip 38 of the temperature compensation probe 34 was placed snugly against the tympanic membrane of the ear by passing the shaft 36 of the probe 34 through a glass tube which was fitted into the ear canal.

1,000 units of heparin sodium were given intravenously after the probes 10, 34 had been placed. Mean arterial blood pressure (MAP) was recorded from a brachial arterial cannula by a pressure transducer.

Figure 4:
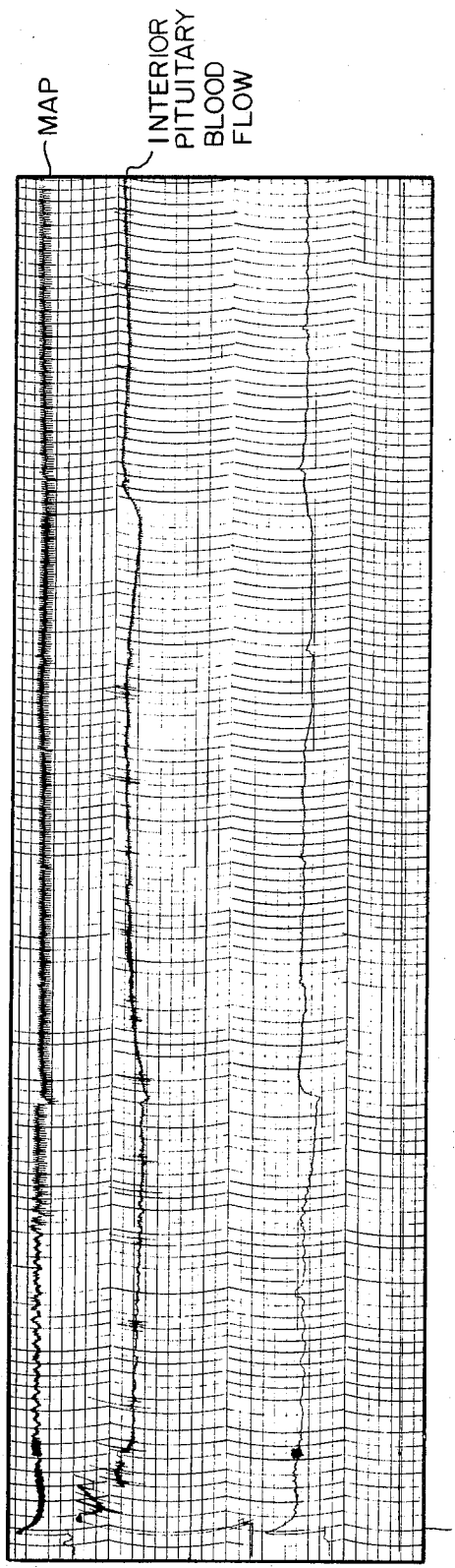
FIG. 4 — illustrates a graph chart showing anterior pituitary blood flow results from Experiment II.

An intravenous injection of sodium pentobarbital produced the anterior pituitary blood flow dynamics as shown in the diagram of FIG. 4. In this diagram chart, A respresents the moment of intravenous injection of ¾ cc. of sodium pentobarbital. Three-quarter cc. of sodium pentobarbital was injected rapidly at the indicated time through a femoral vein cannula. After a brief decline, following closely the initial drop in MAP, the anterior pituitary blood flow rose to 111 percent of the control value. The rise in anterior pituitary blood flow occurred over a time period of approximately 13 minutes. The time axis in the above figure is 0.5 min. per division.

EXPERIMENT III

Figure 5:
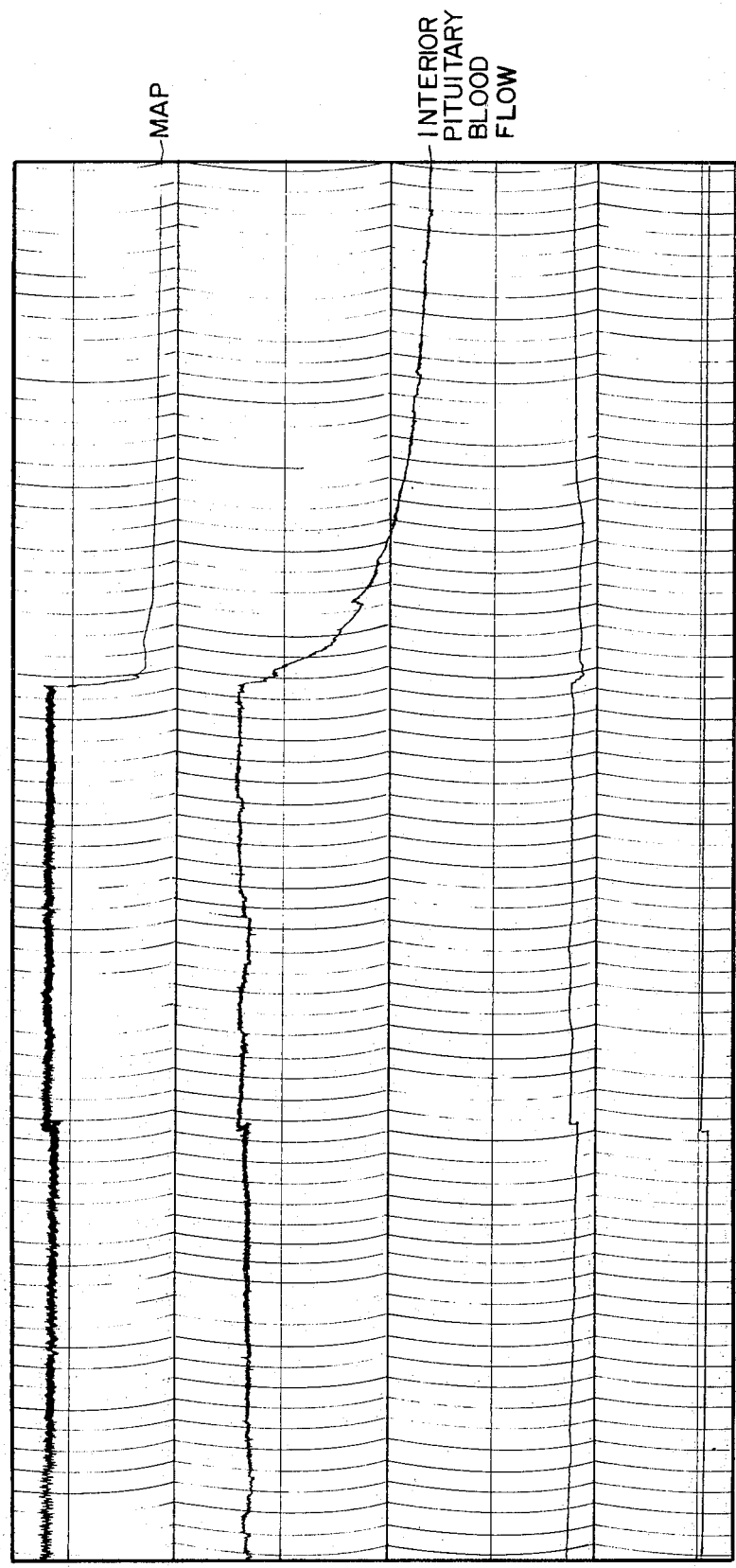
FIG. 5 — illustrates a graphed chart showing anterior pituitary blood flow results from Experiment III.

In a repeat of Experiment 2, at a specified time potassium cloride was injected intraveneously to stop the heart. Anterior pituitary blood flow fell to a stable, well-defined zero base line as shown in the diagram chart of FIG. 5, where the time axis is 0.5 min/division, and B represents the moment of intravenous injection of potassium chloride.

In these Experiments, the respective charts and diagrams illustrate the readings as taken from the probe apparatus and attached read-out means as taught herein.

We claim:

1. A miniaturized thermoelectric probe system for steady state fluid flow measurement comprising:
    A. a first elongate probe having a fine, miniaturized terminal end face and comprising first and second miniature thermistor beads, said beads being separately positioned on the end face, and a first layer of insulating material encasing the thermistor beads;
    B. a second elongate probe having a fine, miniaturized terminal end face and comprising a third miniature thermistor bead, said third bead being positioned on the end face, and a second layer of insulating material encasing the said third thermistor bead;
    c. a bridge circuit connecting the first and third thermistor beads in series in one arm thereof and including feedback means for providing heating current to the second thermistor bead in response to bridge imbalance;
    D. means for sensing current and voltage changes through said second thermistor bead and combining the current and voltage changes to yield an indication of the power consumed in heating the second thermistor bead; and
    E. electrically responsive readout means responsive to the said sensing means.

2. The device as claimed in claim 1, wherein the first elongate probe comprises a tip at the said one end including the miniaturized terminal end face, the tip being positioned angularly relative to the elongate probe, per se.

3. The device as claimed in claim 2, wherein angular disposition of the tip relative to the probe is in the range of 15° to 30° inclusive.

* * * * *